(12) United States Patent
Sonntag et al.

(10) Patent No.: US 12,516,881 B2
(45) Date of Patent: Jan. 6, 2026

(54) MODULAR AERATION SYSTEM

(71) Applicant: S3 GROUP LTD., Regina (CA)

(72) Inventors: Bob Sonntag, Cochrane (CA); Kent Woods, Swift Current (CA); James Braun, Herbert (CA); Al Marques, Swift Current (CA)

(73) Assignee: S3 Group Ltd., Calgary (CA)

( * ) Notice: Subject to any disclaimer, the term of this patent is extended or adjusted under 35 U.S.C. 154(b) by 483 days.

(21) Appl. No.: 17/926,418

(22) PCT Filed: May 20, 2021

(86) PCT No.: PCT/CA2021/000046
§ 371 (c)(1),
(2) Date: Nov. 18, 2022

(87) PCT Pub. No.: WO2021/232139
PCT Pub. Date: Nov. 25, 2021

(65) Prior Publication Data
US 2023/0194169 A1    Jun. 22, 2023

(30) Foreign Application Priority Data

May 21, 2020   (CA) ..................................... 3081074

(51) Int. Cl.
*F26B 9/06*      (2006.01)
*F26B 3/06*      (2006.01)
*F26B 21/00*     (2006.01)

(52) U.S. Cl.
CPC ............... *F26B 9/063* (2013.01); *F26B 3/06* (2013.01); *F26B 21/004* (2013.01); *F26B 2200/06* (2013.01)

(58) Field of Classification Search
CPC ........ F26B 17/14; F26B 17/145; F26B 9/063; F26B 9/103; F26B 3/06; F26B 2200/06
See application file for complete search history.

(56) References Cited

U.S. PATENT DOCUMENTS 1,119,941 A * 12/1914 Elliiott ................ B65D 88/742
                                              454/177
1,522,186 A *  1/1925 Hiestand .............. B65D 88/742
                                              454/177
(Continued)

FOREIGN PATENT DOCUMENTS

CA          3013610         5/2019

OTHER PUBLICATIONS

International Search Report and Written Opinion; International Patent Application Serial No. PCT/CA2021/000046, 8 pages (Aug. 17, 2021).

*Primary Examiner* — Steven S Anderson, II
(74) *Attorney, Agent, or Firm* — Thompson Hine LLP

(57) ABSTRACT

An aeration system for aerating particulate material disposed in a storage bin. The aeration system includes an aerator forming an elongated hollow body for being placed inside the storage bin such that a longitudinal axis thereof is oriented substantially vertical and an air supply duct connected to the aerator for providing the airflow thereto. The aerator enables an airflow therein along the longitudinal axis and provides the same to the particulate material. The aerator is made of a plurality of modular sections adapted for being stacked upon each other along the longitudinal axis. Each modular section has a bottom connecting element and a top connecting element placed at a bottom end and a top end thereof, respectively, with the top connecting element being mated with the respective bottom connecting element of an adjacent modular section. Each modular section has a conduit enabling the airflow along the longitudinal axis. At least an opening is disposed in the conduit of at least one modular section for providing the airflow to the particulate material. The at least an opening is covered by a cover extending from the conduit downwardly and outwardly.

20 Claims, 22 Drawing Sheets

(56) References Cited

U.S. PATENT DOCUMENTS

| | | | | |
|---|---|---|---|---|
| 4,077,134 A | * | 3/1978 | Steffen | F26B 9/103 |
| | | | | 34/443 |
| 8,556,688 B2 | | 10/2013 | Pacheco Da Cunha | |
| 8,720,079 B2 | * | 5/2014 | Neufeld | F26B 17/1425 |
| | | | | 34/174 |
| 2002/0003171 A1 | * | 1/2002 | Walker | B05B 17/08 |
| | | | | 239/23 |
| 2009/0094853 A1 | * | 4/2009 | Noyes | F26B 9/103 |
| | | | | 34/232 |
| 2014/0041247 A1 | | 2/2014 | Schreiner | |

* cited by examiner

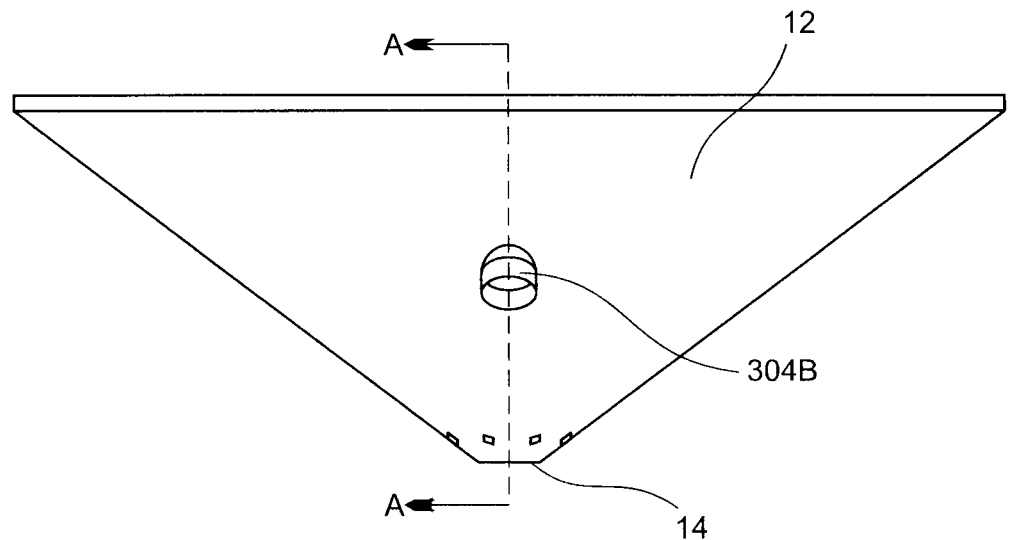
Figure 22
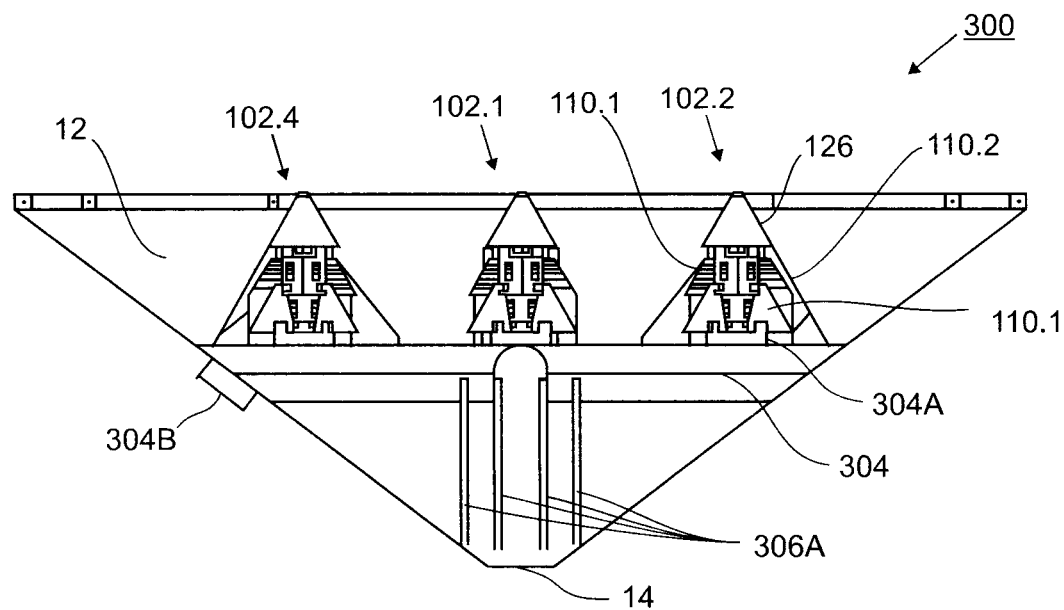
Figure 23 (Section A-A)

MODULAR AERATION SYSTEM

This application is a national stage filing of International (PCT) Application No. PCT/CA2021/000046, corresponding to International Publication No. WO 2021/232139, filed on May 20, 2021, which in turn claims priority to Canadian Application No. 3,081,074, filed on May 21, 2020. The entire contents of both of those applications are hereby incorporated by reference.

FIELD

The present invention relates to ventilation of particulate materials disposed in a storage bin, and more particularly to a modular aeration system that can be installed as a retrofit in existing storage bins.

BACKGROUND

Harvested grain such as, for example, wheat, rye, barley, canola, soybeans, and corn, is typically stored in storage bins-on site at a farm or commercial storage facilities-prior to distribution for processing or sale. Present-day agricultural storage bins are not only used for storing the grains therein, but also for assisting in drying, cooling, heating, and pest control by employing aeration systems disposed therein. Aeration systems supply air flow to the agricultural storage bins for drying, cooling, heating, and pest control.

However, many existing agricultural storage bins do not have aeration systems, as well as numerous new agricultural storage bins are constructed without aeration systems, only to discover later that an aeration system is needed. As is well known in the art, retrofitting an existing agricultural storage bin can be challenging.

One technique for retrofitting an existing agricultural storage bin with an aeration system is to lower the aeration system through the roof thereof. Unfortunately, this technique requires: removal and re-attachment of a section of the roof of the agricultural storage bin; and, employment of a crane of substantial size, resulting in typically prohibitively high installation cost. Another technique for retrofitting an existing agricultural storage bin with an aeration system is providing the aeration system as a plurality of parts that fit through, for example, a manhole or a discharge hole, at the bottom of the agricultural storage bin. The parts are then assembled inside the agricultural storage bin which is typically a complex, arduous, time-consuming, and potentially dangerous task, in particular, when the aeration system is of larger size with a large number of parts to be assembled and the agricultural storage bin has a hopper bottom that makes standing thereon cumbersome or even dangerous for the installation of said system. Furthermore, some parts of the aeration system typically have a substantial length making handling difficult and requiring substantial space for transportation.

It may be desirable to provide an aeration system comprising modules that enable simple and time-saving assembly of the same.

It also may be desirable to provide an aeration system comprising modules that can be assembled with limited use of tools.

It also may be desirable to provide an aeration system comprising modules that easily handled and allow stacking of the same in a compact fashion for transport and storage.

It also may be desirable to provide an aeration system comprising a bottom support structure that facilitates assembly in storage bins having a hopper bottom by providing installers a stable flat surface to stand on.

SUMMARY

Accordingly, one object is to provide an aeration system comprising modules that enable simple and time-saving assembly of the same.

Another object is to provide an aeration system comprising modules that can be assembled with limited use of tools.

Another object is to provide an aeration system comprising modules that easily handled and allow stacking of the same in a compact fashion for transport and storage.

Another object is to provide an aeration system comprising a bottom support structure that facilitates assembly in storage bins having a hopper bottom by providing installers a stable flat surface to stand on.

According to one aspect, there is provided an aeration system for aerating particulate material disposed in a storage bin. The aeration system comprises an aerator forming an elongated hollow body for being placed inside the storage bin such that a longitudinal axis thereof is oriented substantially vertical and an air supply duct connected to the aerator for providing the airflow thereto. The aerator enables an airflow therein along the longitudinal axis and provides the same to the particulate material. The aerator is made of a plurality of modular sections adapted for being stacked upon each other along the longitudinal axis. Each modular section has a bottom connecting element and a top connecting element placed at a bottom end and a top end thereof, respectively, with the top connecting element being mated with the respective bottom connecting element of an adjacent modular section. Each modular section has a conduit enabling the airflow along the longitudinal axis. At least an opening is disposed in the conduit of at least one modular section for providing the airflow to the particulate material. The at least an opening is covered by a cover extending from the conduit downwardly and outwardly.

According to one aspect, there is provided an aeration system for aerating particulate material disposed in a storage bin. The aeration system comprises an aerator forming an elongated hollow body for being placed inside the storage bin such that a longitudinal axis thereof is oriented substantially vertical and an air supply duct connected to the aerator for providing the airflow thereto. The aerator enables an airflow therein along the longitudinal axis and provides the same to the particulate material. The aerator is made of a plurality of modular sections adapted for being stacked upon each other along the longitudinal axis. Each modular section has a bottom connecting element and a top connecting element placed at a bottom end and a top end thereof, respectively, with the top connecting element being mated with the respective bottom connecting element of an adjacent modular section. Each modular section has a conduit enabling the airflow along the longitudinal axis. At least an opening is disposed in the conduit of at least one modular section for providing the airflow to the particulate material. The at least an opening is covered by a cover extending from the conduit downwardly and outwardly. The at least one modular section is made of at least two modules with each module having an inner wall forming a part of the conduit. Each of the at least two modules comprises a part of the top connecting element and the bottom connecting element.

According one aspect, there is provided an aeration system for aerating particulate material disposed in a storage bin. The aeration system comprises an aerator forming an elongated hollow body for being placed inside the storage bin such that a longitudinal axis thereof is oriented substantially vertical and an air supply duct connected to the aerator for providing the airflow thereto. The aerator enables an airflow therein along the longitudinal axis and provides the same to the particulate material. The aerator is made of a plurality of modular sections adapted for being stacked upon each other along the longitudinal axis. Each modular section has a bottom connecting element and a top connecting element placed at a bottom end and a top end thereof, respectively, with the top connecting element being mated with the respective bottom connecting element of an adjacent modular section. Each modular section has a conduit enabling the airflow along the longitudinal axis. At least an opening is disposed in the conduit of at least one modular section for providing the airflow to the particulate material. The at least an opening is covered by a cover extending from the conduit downwardly and outwardly. The cover comprises a cover wall extending from the top end to the bottom end of the at least one modular section downwardly and outwardly and surrounding the conduit.

According to another aspect, there is provided an aeration system for aerating particulate material disposed in a storage bin. The aeration system comprises a plurality of aerators with each aerator forming an elongated hollow body for being placed inside the storage bin such that a longitudinal axis thereof is oriented substantially vertical. An air supply duct is connected to each of the aerator for providing the airflow thereto. Each of the aerators enables an airflow therein along the longitudinal axis and provides the same to the particulate material. Each of the aerators is made of a plurality of modular sections adapted for being stacked upon each other along the longitudinal axis. Each modular section has a bottom connecting element and a top connecting element placed at a bottom end and a top end thereof, respectively, with the top connecting element being mated with the respective bottom connecting element of an adjacent modular section. Each modular section has a conduit enabling the airflow along the longitudinal axis. At least an opening is disposed in the conduit of at least one modular section for providing the airflow to the particulate material. The at least an opening is covered by a cover extending from the conduit downwardly and outwardly.

An advantage of the present disclosure is that it provides an aeration system comprising modules that enable simple and time-saving assembly of the same.

A further advantage of the present disclosure is that it provides an aeration system comprising modules that can be assembled with limited use of tools.

A further advantage of the present disclosure is that it provides an aeration system comprising modules that easily handled and allow stacking of the same in a compact fashion for transport and storage.

A further advantage of the present disclosure is that it provides an aeration system comprising a bottom support structure that facilitates assembly in storage bins having a hopper bottom by providing installers a stable flat surface to stand on.

BRIEF DESCRIPTION OF THE DRAWINGS

An embodiment is described below with reference to the accompanying drawings, in which:

FIG. 22 is a simplified block diagram illustrating in a side view a hopper bottom having the aeration system according to the other embodiment disposed therein;

FIG. 23 is a simplified block diagram illustrating in a cross sectional view the aeration system according to the other embodiment; and, FIG. 24 is a simplified block diagram illustrating in a perspective top view an air supply duct connector of the aeration system according to the other embodiment.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

While the description of the embodiments hereinbelow is with reference to an aeration system for aerating grain disposed in an agricultural storage bin, it will become evident to those skilled in the art that the embodiments of the invention are not limited thereto, but are also adaptable for aerating numerous other particulate materials disposed in storage bins.

Figure 1:
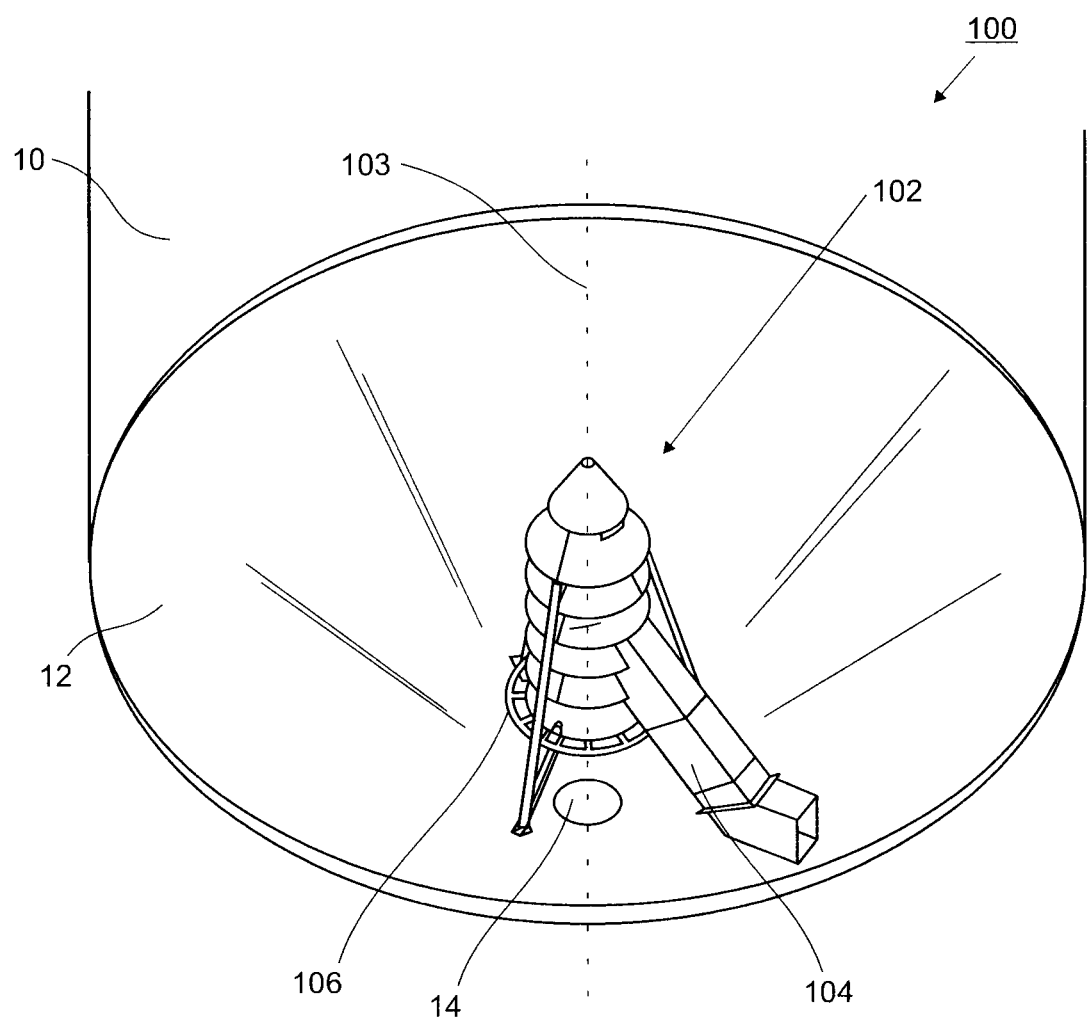
FIG. 1 is a simplified block diagram illustrating in a perspective top view an aeration system according to an embodiment.

Referring to FIGS. 1 to 19 a modular aeration system 100 according to an embodiment is provided. The modular aeration system 100 comprises aerator 102 connected to air supply duct 104 for providing an airflow thereto, as illustrated in FIG. 1. The aerator 102 forms an elongated hollow body which is placed inside a storage bin 10 such that a longitudinal axis 103 thereof is oriented substantially vertical. Typically, the aerator 102 is placed onto a support base 106 which is mounted to hopper bottom 12 of the storage bin 10, for example, above discharge hole 14. Alternatively, the aerator 102 and the support base 106 may be placed onto a bottom of a storage bin 10 without hopper bottom, or the aerator 102 may be directly placed onto a flat and substantially horizontal bottom floor of the storage bin. The aerator 102 enables airflow therein along the longitudinal axis 103 and provides the same to the particulate material such as grain, as will be described hereinbelow.

Figure 2:
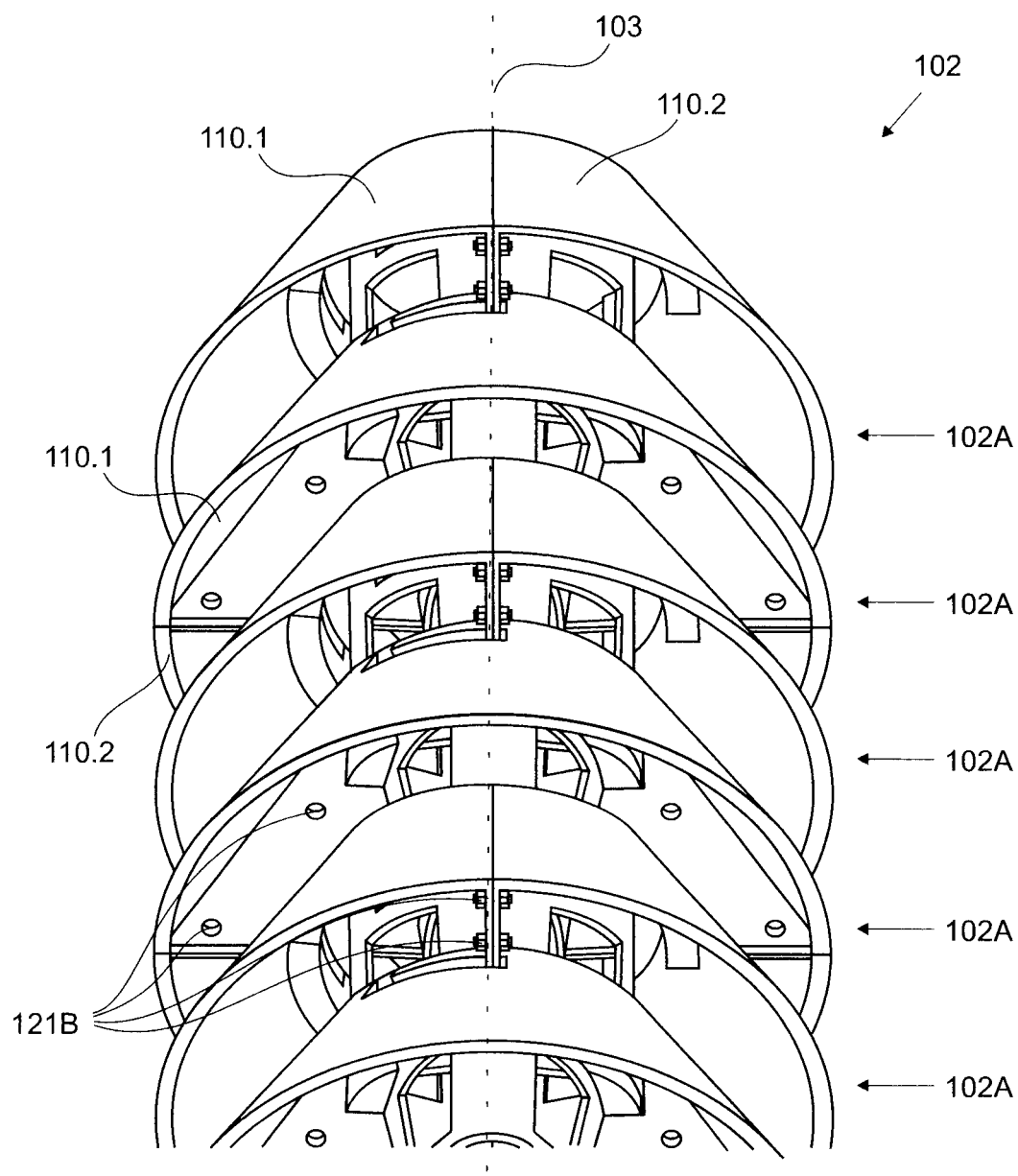
FIG. 2 is a simplified block diagram illustrating in a perspective bottom view modular sections of an aerator of the aeration system according to an embodiment.

The aerator 102 is made of a plurality of modular sections 102A stacked upon each other along the longitudinal axis 103, as illustrated in FIG. 2. The modular sections 102A can be made of two modules 110.1, 110.2 with each module 110.1, 110.2 having an inner wall 112 forming a part of conduit 114 for enabling the airflow along the longitudinal axis 103, as indicated by the dashed block arrow in FIG. 3. It is noted that each of the modular sections 102A may be provided as a single unit or by combining two or more modules. Provision of the modular sections 102A by combining two or more modules facilitates handling and movement of the same through a manhole for retrofit installation of larger size aerators.

Figure 3:
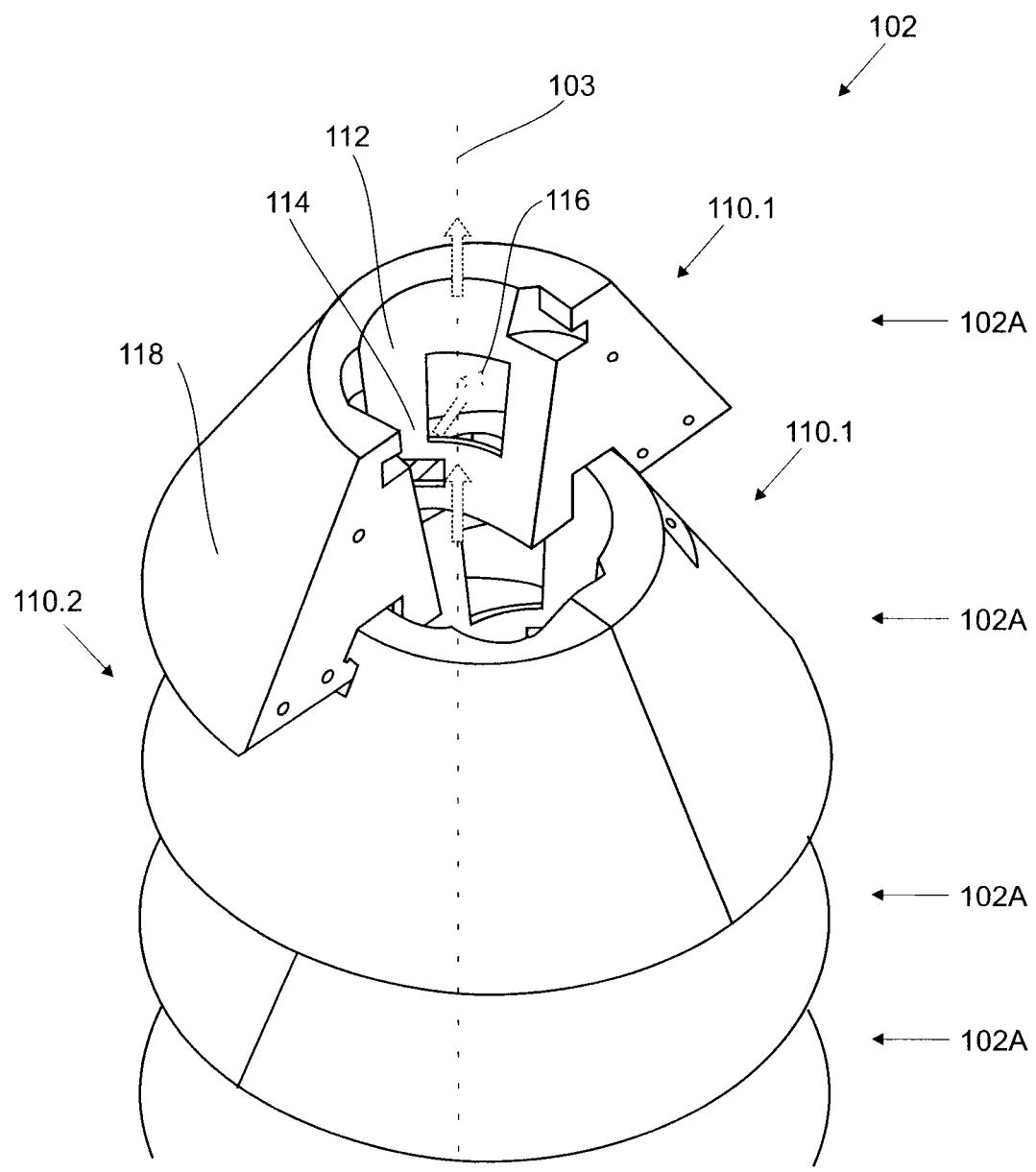
FIG. 3 is a simplified block diagram illustrating in a perspective top view modular sections of an aerator of the aeration system according to an embodiment.
Figure 4:
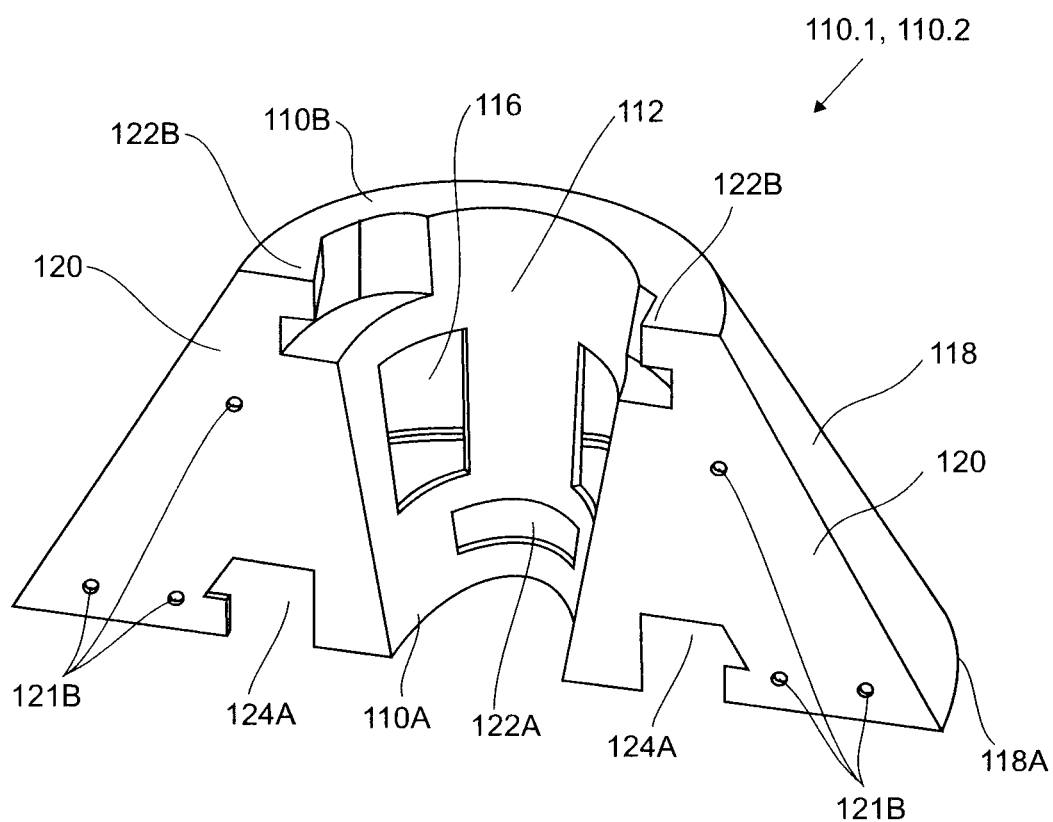
FIG. 4 is a simplified block diagram illustrating in perspective top view modules of a modular section of the aeration system according to an embodiment.
Figure 5:
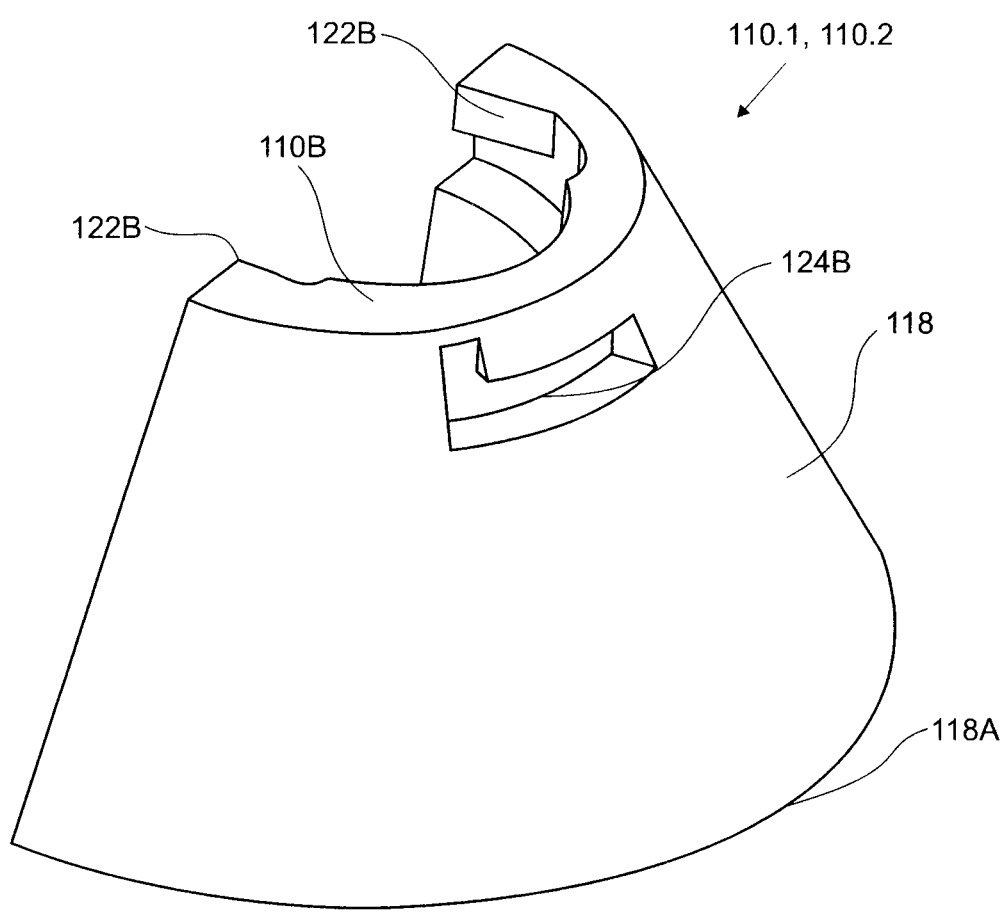
FIG. 5 is a simplified block diagram illustrating in perspective top view modules of a modular section of the aeration system according to an embodiment.

Openings 116 disposed in the inner wall 112 enables provision of the airflow to the particulate material, as indicated by the small dashed block arrow in FIG. 3. The openings 116 can be larger than a particle size of the particulate material to enable a larger airflow into the particulate material and to reduce resistance. Each of the openings 116 is covered by a cover extending from the inner wall 112 downwardly and outwardly a sufficient distance such that particles are prevented from entering the conduit 114. The cover may be a cover individually covering each opening 116. The cover can comprise a cover wall 118 extending from a top end 110B of the modules 110.1, 110.2 extending downwardly and outwardly from the inner wall 112 and surrounding the same, as illustrated in FIGS. 4 and 5. Further, the cover wall 118 can extend to a bottom end 110A of the modules 110.1, 110.2. It is noted that not each modular section 102A or each module 110.1, 110.2 may have openings 116 depending on design requirements of the aerator 102. As is evident, in case a modular section 102A or a module 110.1, 110.2 has no opening 116, the cover or cover wall 118 may be omitted.

The modules 110.1, 110.2 can have a same shape with each module 110.1, 110.2 having bottom connecting elements 122A and 124A placed at a bottom end 110A thereof and top connecting elements 122B and 124B placed at a top end 110B thereof. Provision of the modules 110.1, 110.2 as a module having a same shape substantially facilitates design and manufacture thereof, thus substantially reducing cost. Further, the modules 110.1, 110.2 can each have two end walls 120 connecting an end edge of the inner wall 112 with an end edge of the cover wall 118. The end walls 120 are oriented such that two adjacent end walls 120 of two combined modules 110.1 and 110.2 are in a touching relationship when assembled. Further, the two adjacent end walls 120 can be shaped to form a same part of the bottom connecting element 124A. Provision of the end walls 120 increases the structural strength of the modules 110.1 and 110.2, as well as facilitates assembly of the same.

Figure 6:
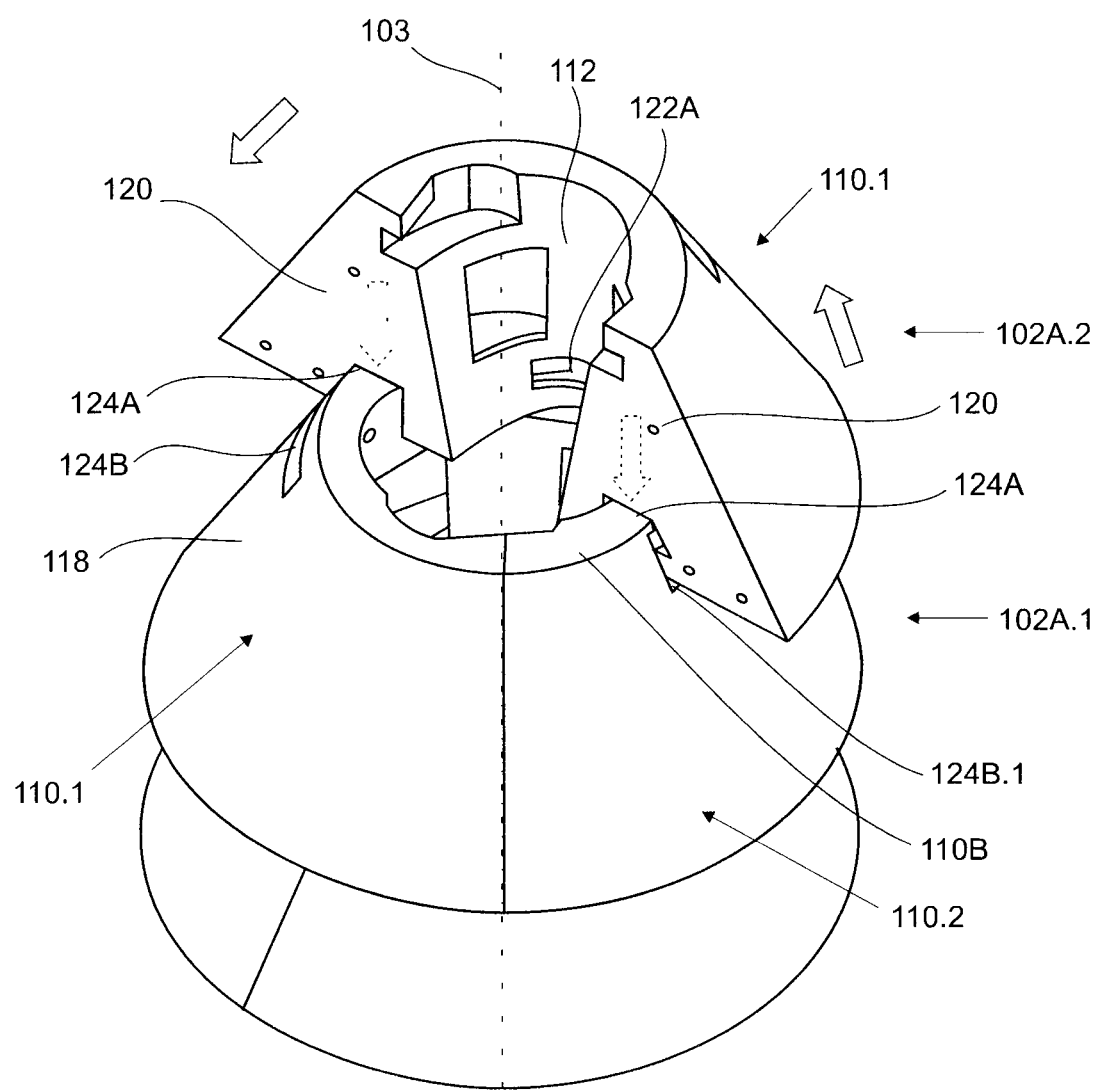
FIG. 6 is a simplified block diagram illustrating in perspective top view connecting of two modular sections of the aerator of the aeration system according to an embodiment.
Figure 7:
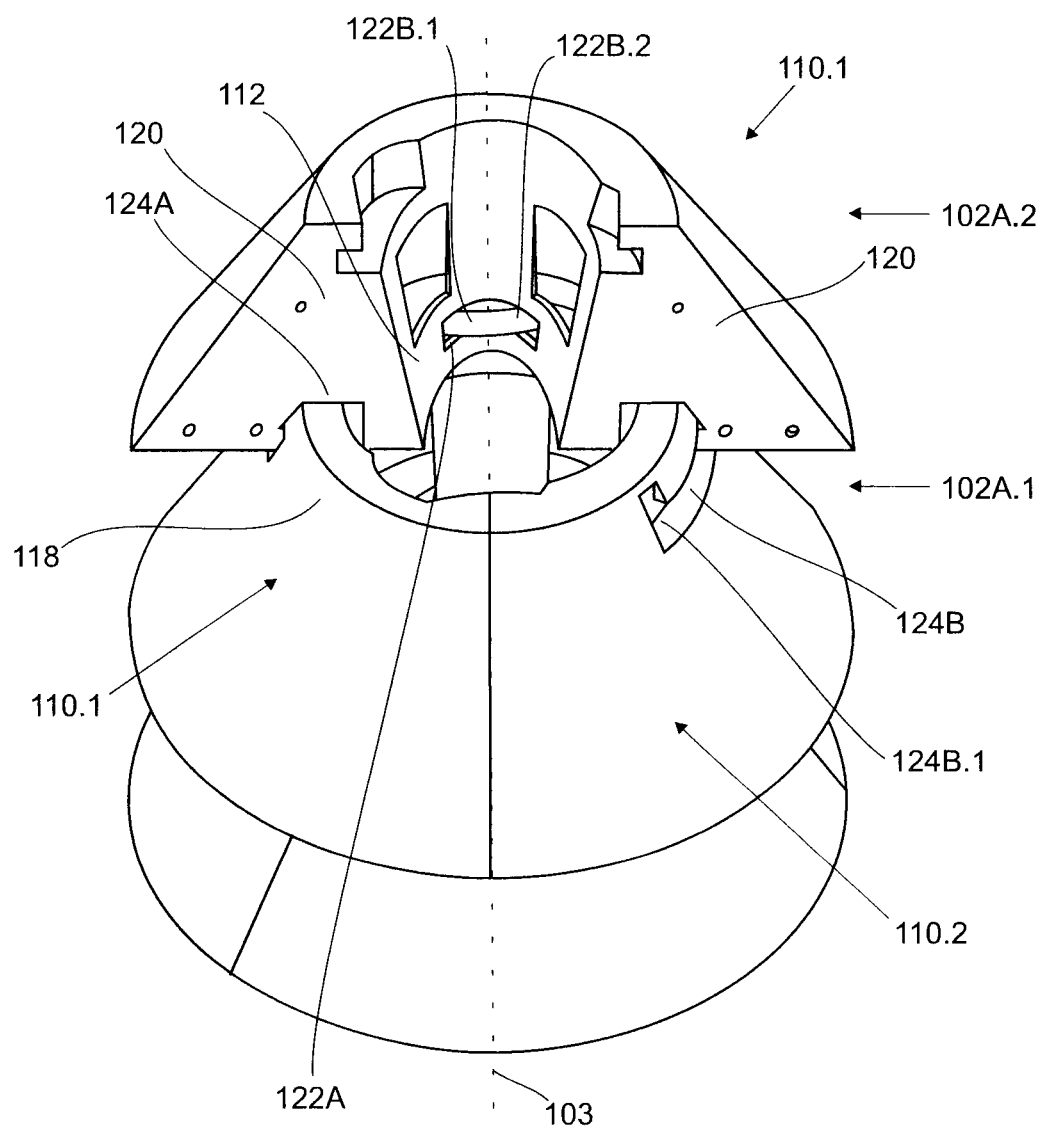
FIG. 7 is a simplified block diagram illustrating in perspective top views connecting of two modular sections of the aerator of the aeration system according to an embodiment.
Figure 8:
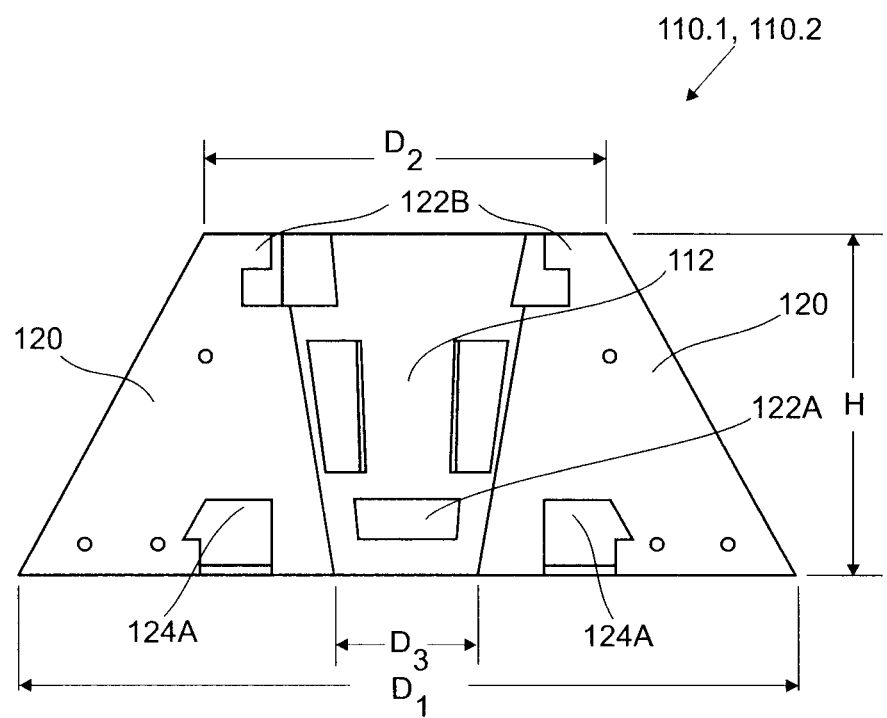
FIG. 8 is a simplified block diagram illustrating in a side view a module of a modular section of the aeration system according to an embodiment.

Further, the bottom connecting elements 122A and 124A and the top connecting elements 122B and 124B can be shaped to form a bayonet type connector, as illustrated in FIGS. 6 and 7. For example, the modules 110.1 and 110.2 forming modular section 102A.2 are simply mounted to the previous modular section 102A.1 by:

1) holding the two modules 110.1 and 110.2 forming modular section 102A.2 together such that the two adjacent end walls 120 touch each other;
2) inserting the bottom connecting elements 124A disposed in the end walls 120 of the two modules 110.1 and 110.2 forming modular section 102A.2 into end portions 124B.1 of the respective top connecting elements 124B of the two modules 110.1 and 110.2 forming modular section 102A.1, as indicated by the dashed block arrows in FIG. 6 (only one module 110.1 is shown for clarity); and,
3) turning the two modules 110.1 and 110.2 forming modular section 102A.2 about the longitudinal axis 103 until abutment (approximately) 40°, as indicated by the solid block arrows in FIG. 6.

After turning and abutment, the two modules 110.1 and 110.2 forming modular section 102A.2 are connected to the two modules 110.1 and 110.2 forming modular section 102A.1 through interaction of the two bottom connecting elements 124A with the respective two top connecting elements 124B, as well as bottom connecting element 122A with the two top connecting elements 122B.1 and 122B.2 of the respective two modules 110.1 and 110.2 forming modular section 102A.1, thus securing the modular section 102A.2 to the previous modular section 102A.1, as well as securing the modules 110.1 and 110.2 of each modular section 102A to each other.

The modules 110.1 and 110.2 can comprise interlocking elements 121A such as, for example, screw bolts and respective nuts accommodated in respective bores 121B, for securing the same to each other prior mounting to another modular section, as illustrated in FIGS. 2 and 4.

In an example implementation the modules 110.1, 110.2 are made of a suitable plastic material such as, for example, Poly Ethylene (PE), using a standard plastic moulding process with the dimensions: $D_1=27"$; $D_2=12.5"$; $D_3=5"$; and $H=11.5"$ illustrated in FIG. 8.

As is evident to those skilled in the art, the invention is not limited thereto and, depending on design preferences, the modules 110.1, 110.2 may be provided in different sizes and may be made of other suitable materials such as, for example, aluminum sheet material or steel sheet material using conventional metal processing technologies.

Figure 9:
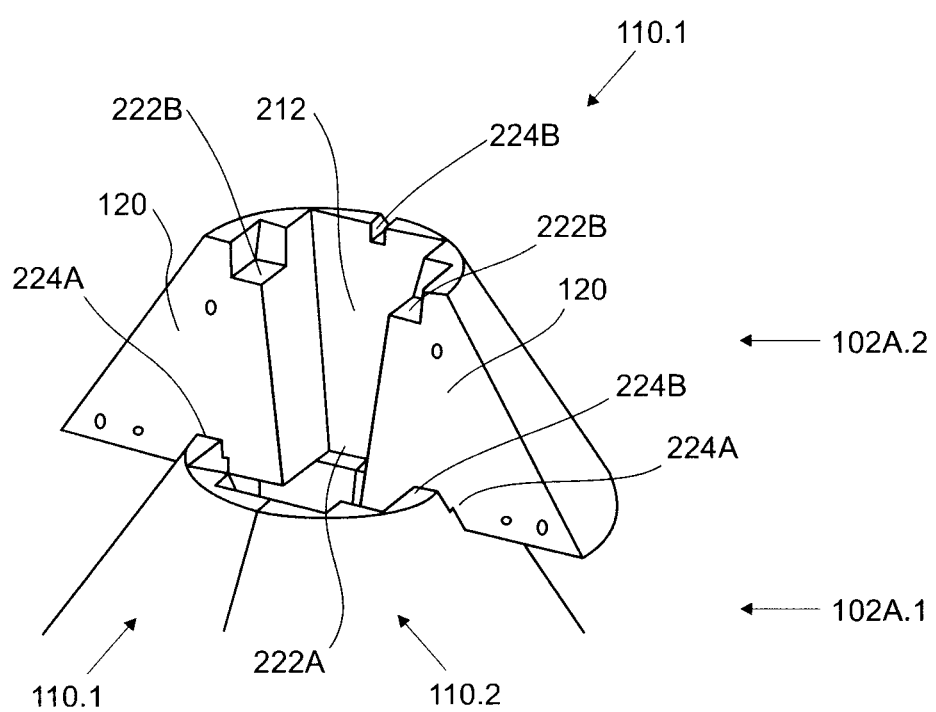
FIG. 9 is a simplified block diagram illustrating in a perspective top view connecting of two modular sections of the aerator of the aeration system according to another embodiment.

Further alternatively, different type connecting elements may be employed such as, for example, rectangular bottom connecting elements 222A and 224A and respective rectangular top connecting elements 222B and 224B, as illustrated in FIG. 9.

Figure 10:
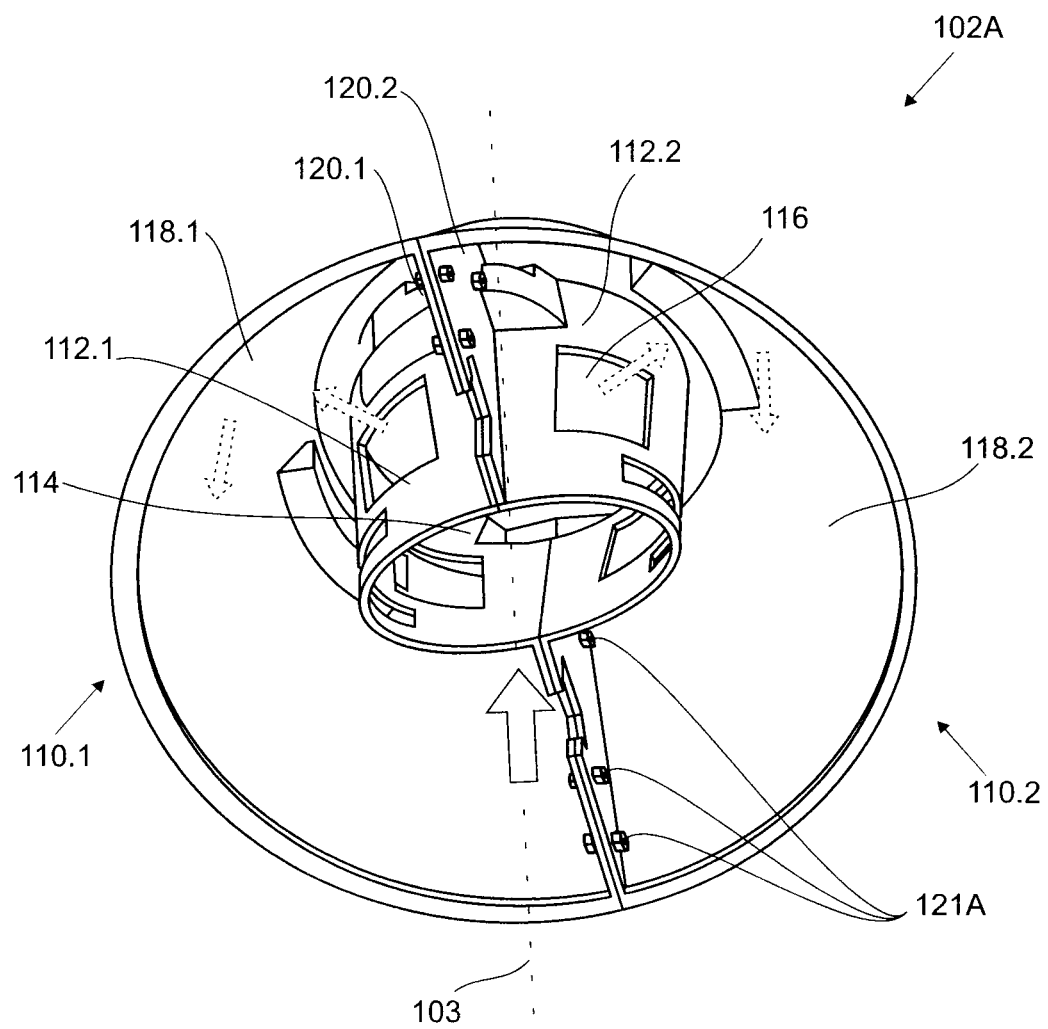
FIG. 10 is a simplified block diagram illustrating in a perspective bottom view airflow through a modular section of the aerator of the aeration system according to an embodiment.
Figure 11:
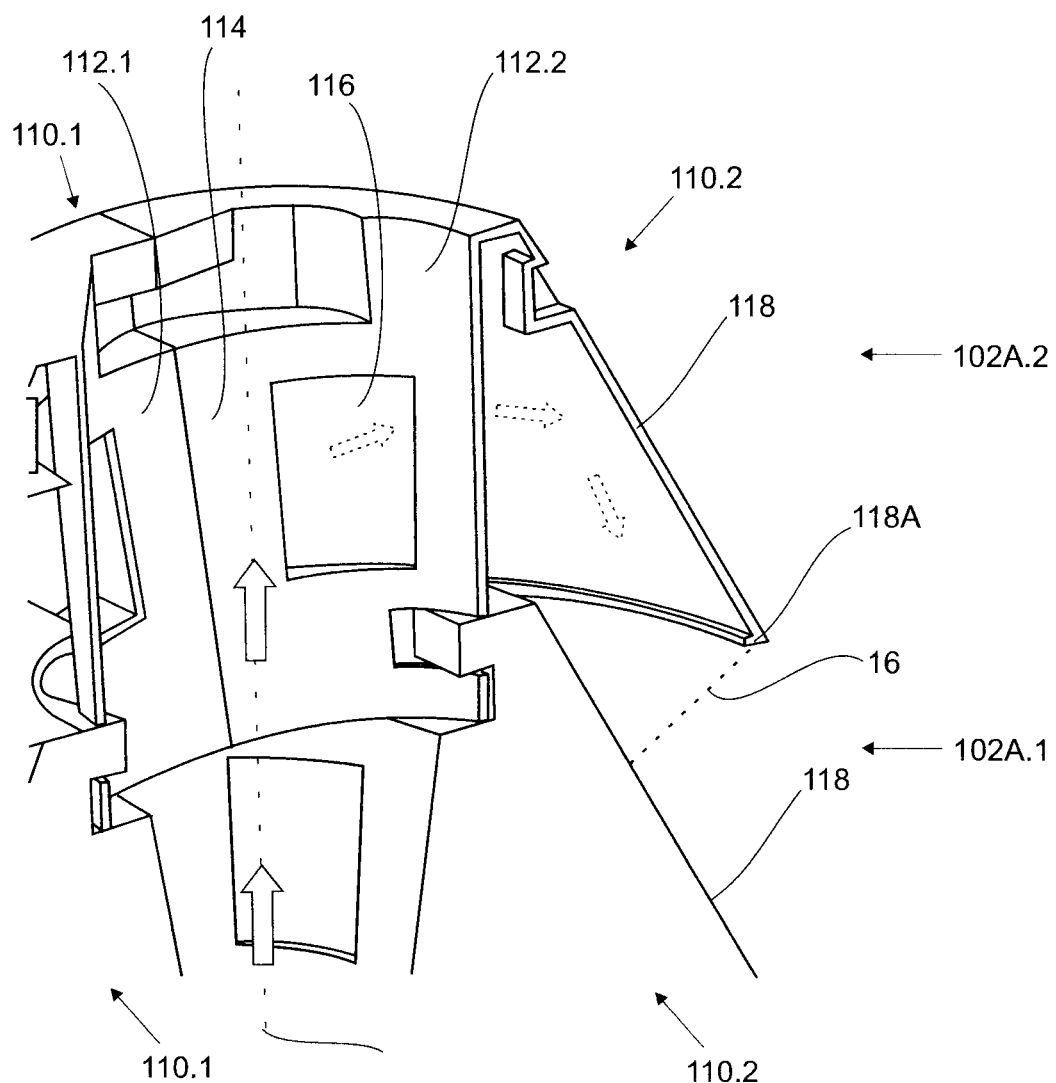
FIG. 11 is a simplified block diagram illustrating in a cross sectional view airflow through a modular section of the aerator of the aeration system according to an embodiment.

In operation, the airflow along the longitudinal axis 103 is enabled by the inner walls 112.1 and 112.2 of the respective modules 110.1 and 110.2 forming the conduit 114, as indicated by the solid block arrows in FIGS. 10 and 11. A portion of the air flows through the openings 116 disposed in the inner walls 112.1 and 112.2 and is directed downwardly by the respective cover walls 118.1 and 118.2, as indicated by the dashed block arrows in FIGS. 10 and 11, into the particulate material 16, as indicated by the dashed line in FIG. 11. The cover walls 118.1 and 118.2 prevent the particulate material 16 from entering the conduit 114 through the openings 116 and create an air space between the inner walls 112.1 and 112.2, the cover walls 118.1 and 118.2 and the top of the particulate material 16.

As is evident to those skilled in the art, the embodiments of the invention are not limited to cover walls 118.1 and 118.2 extending downwardly and outwardly in a straight fashion, as illustrated, but may be curved having various types of curvature. Furthermore, the cross section of the conduit 114 and the cover walls 118.1 and 118.2 may have various shapes other than oval and circular, respectively, as illustrated.

Figure 12:
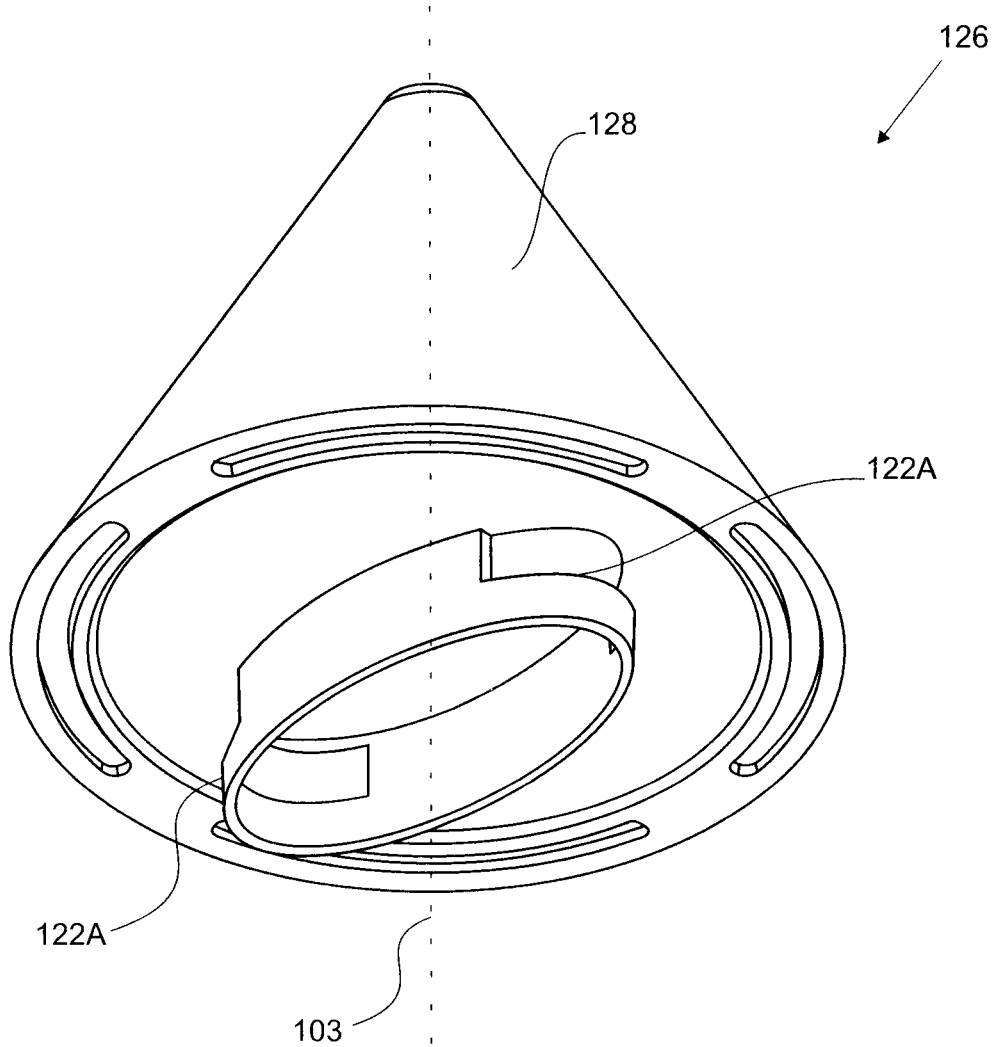
FIG. 12 is a simplified block diagram illustrating in a perspective bottom view a cap of the aerator of the aeration system according to an embodiment.

Referring to FIG. 12, the aerator 102 further comprises a top cap 126 for preventing the particulate material from entering the top of the conduit 114. The top cap 126 can comprise a structure 128 for deflecting the particulate material during filling of the storage bin 10 such as, for example, a cone or dome shaped structure, and bottom connecting elements 122A placed at a bottom end thereof which are connected with the respective top connecting elements 122B of the top modular section 102A of the aerator 102.

Figure 13:
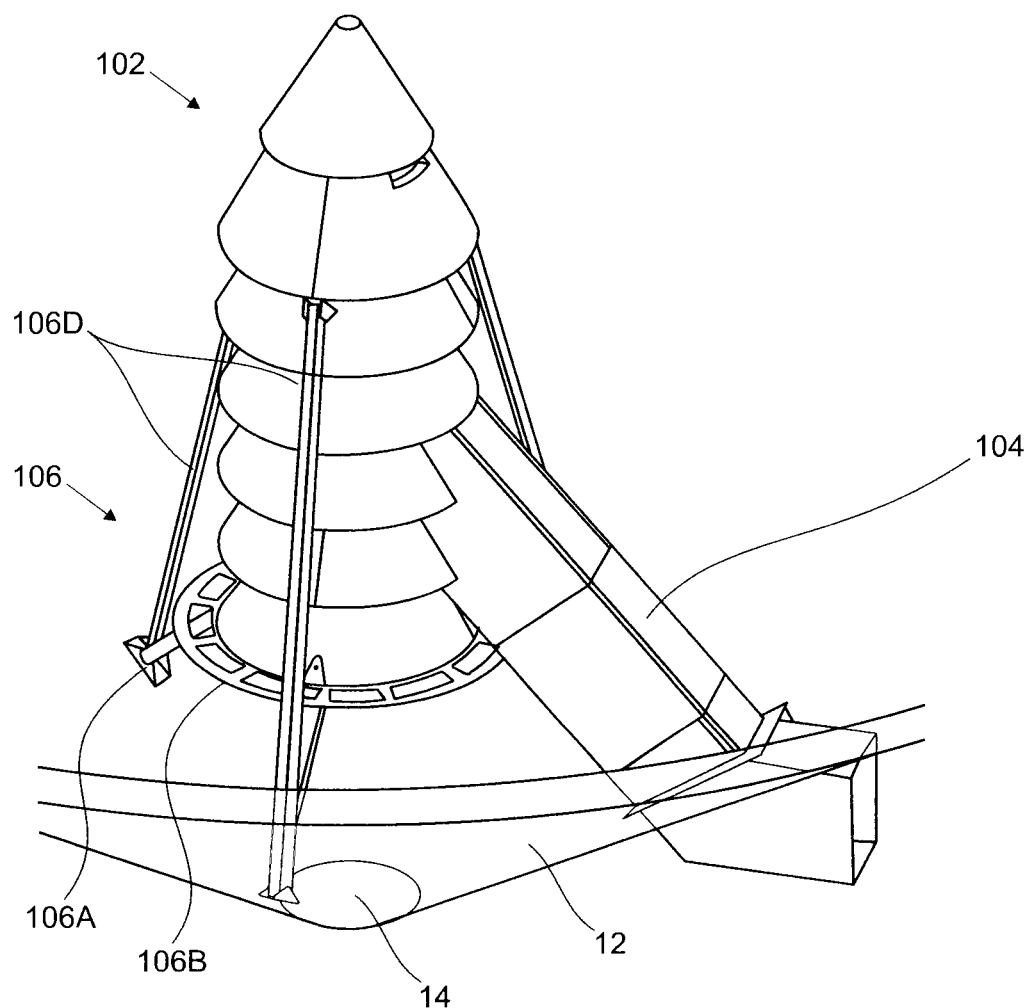
FIG. 13 is a simplified block diagram illustrating in a perspective top view a bottom portion and support base of the aerator of the aeration system according to an embodiment.
Figure 14:
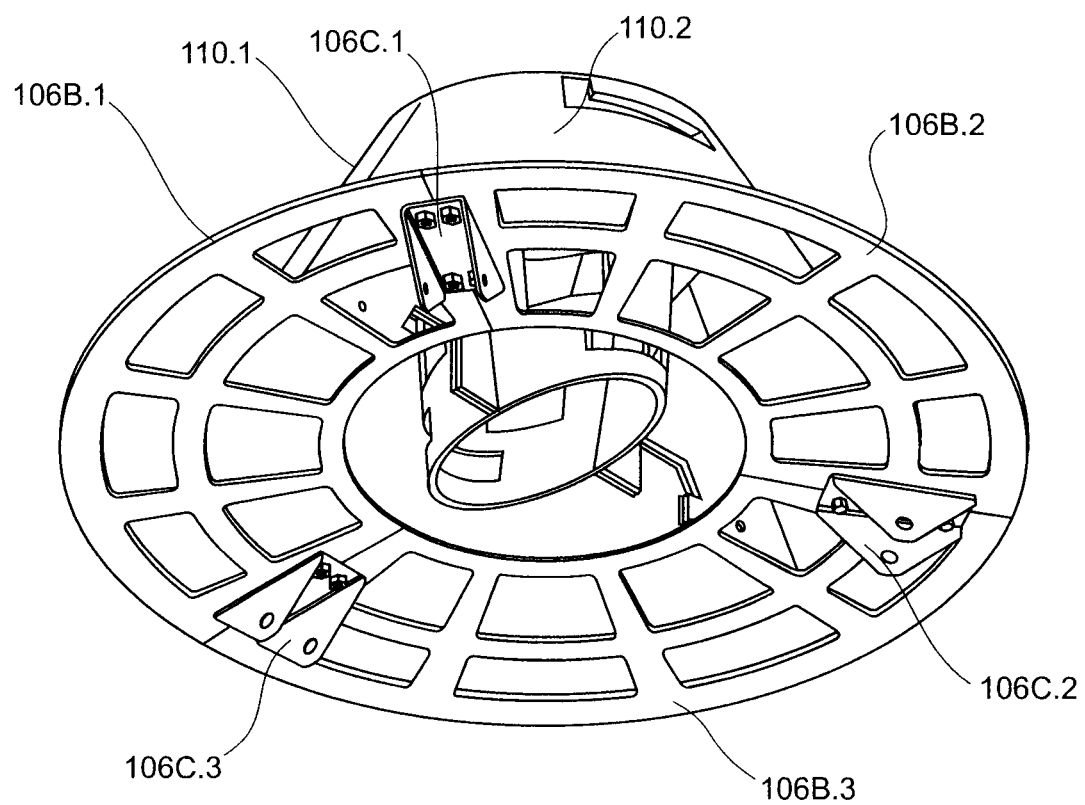
FIG. 14 is a simplified block diagram illustrating in a perspective bottom view a bottom portion and support base of the aerator of the aeration system according to an embodiment.

The aerator 102 can be placed onto a support base 106, as illustrated in FIGS. 13 and 14. The support base 106 comprises, for example, a substantially flat grate-type top plate 106B mounted to legs 106A, which are adapted for being mounted to the hopper bottom 12 of a storage bin 10. Further, the grate-type top plate 106B can have a diameter that is larger than the diameter of the aerator 102 to provide some space for a worker to stand thereon during installation. The top plate 106B being of grate-type enables the particulate material to pass therethrough during filling and discharging of the storage bin 10. To facilitate handling and movement through a manhole, the top plate 106B is provided in a plurality of parts such as, for example, three parts 106B.1, 106B.2, and 106B.3 which are connected via connectors 106C.1, 106C.2, and 106C.3 with the same having the respective legs 106A mounted thereto. The base 106 is made of, for example, aluminum or steel components which are assembled in a conventional manner using screw fasteners. Optionally, the bottom modular section 102A of the aerator 102 is secured to the top plate 106 in a conventional manner using, for example, connecting elements and screw fasteners. Further optionally, support brackets 106D are provided for strengthening the aerator 102. The support brackets 106D are mounted, for example, to the legs 106A and the modules 110.1 and 110.2.

Figure 15:
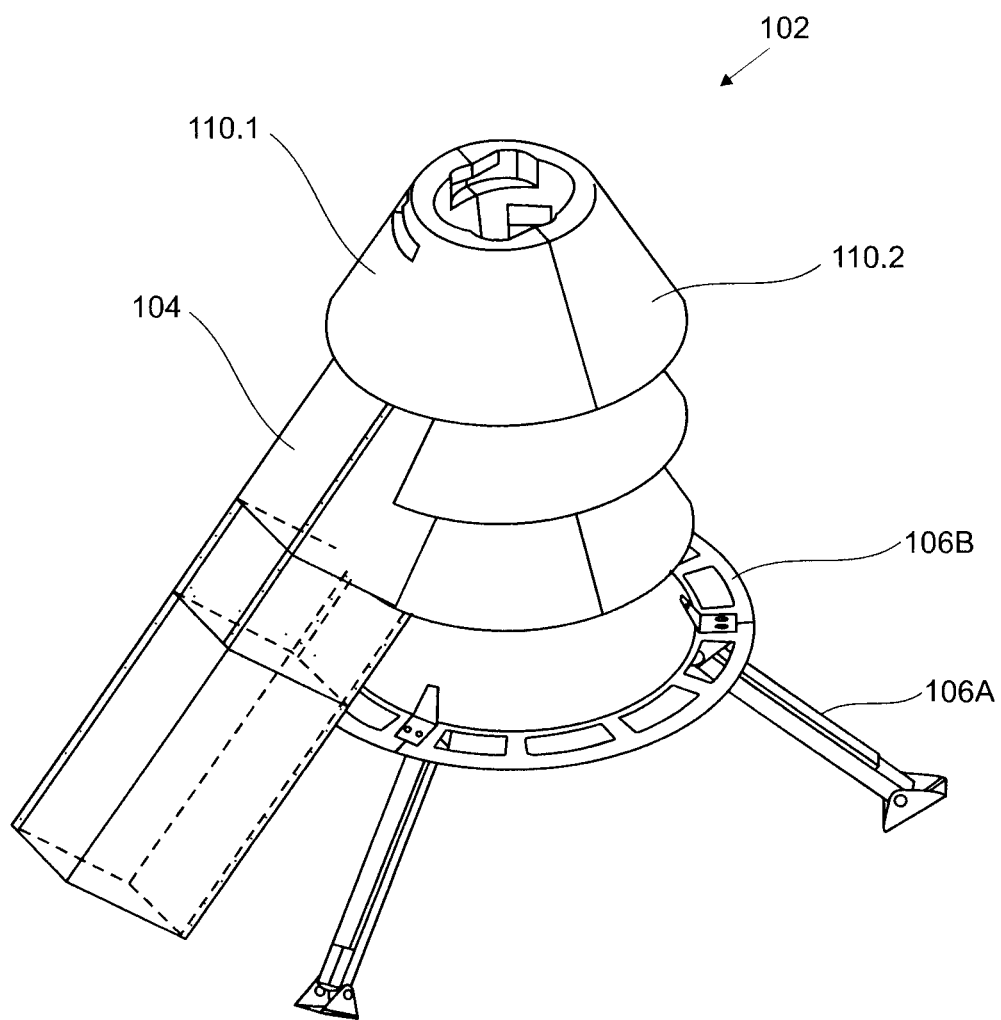
FIG. 15 is a simplified block diagram illustrating in a perspective top view an air supply conduit connected to a bottom portion of the aerator of the aeration system according to an embodiment.
Figure 16:
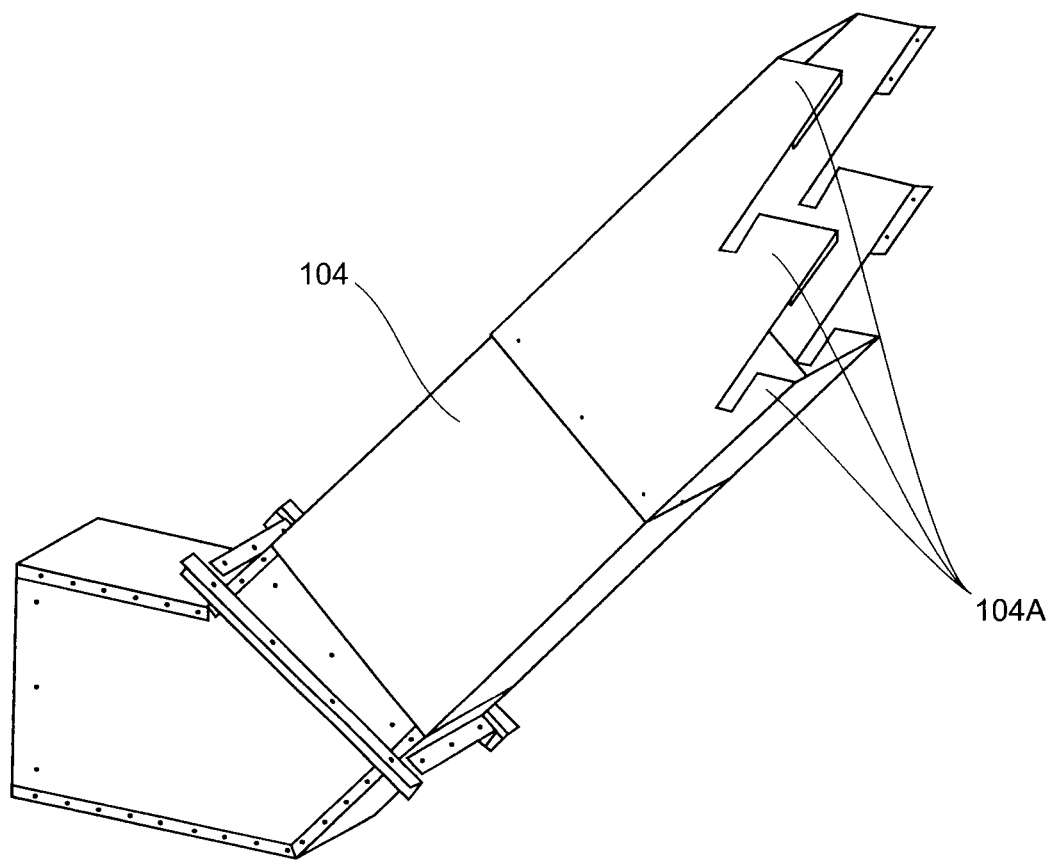
FIG. 16 is a simplified block diagram illustrating in a perspective top view an end portion of the air supply conduit of the aeration system according to an embodiment.
Figure 17:
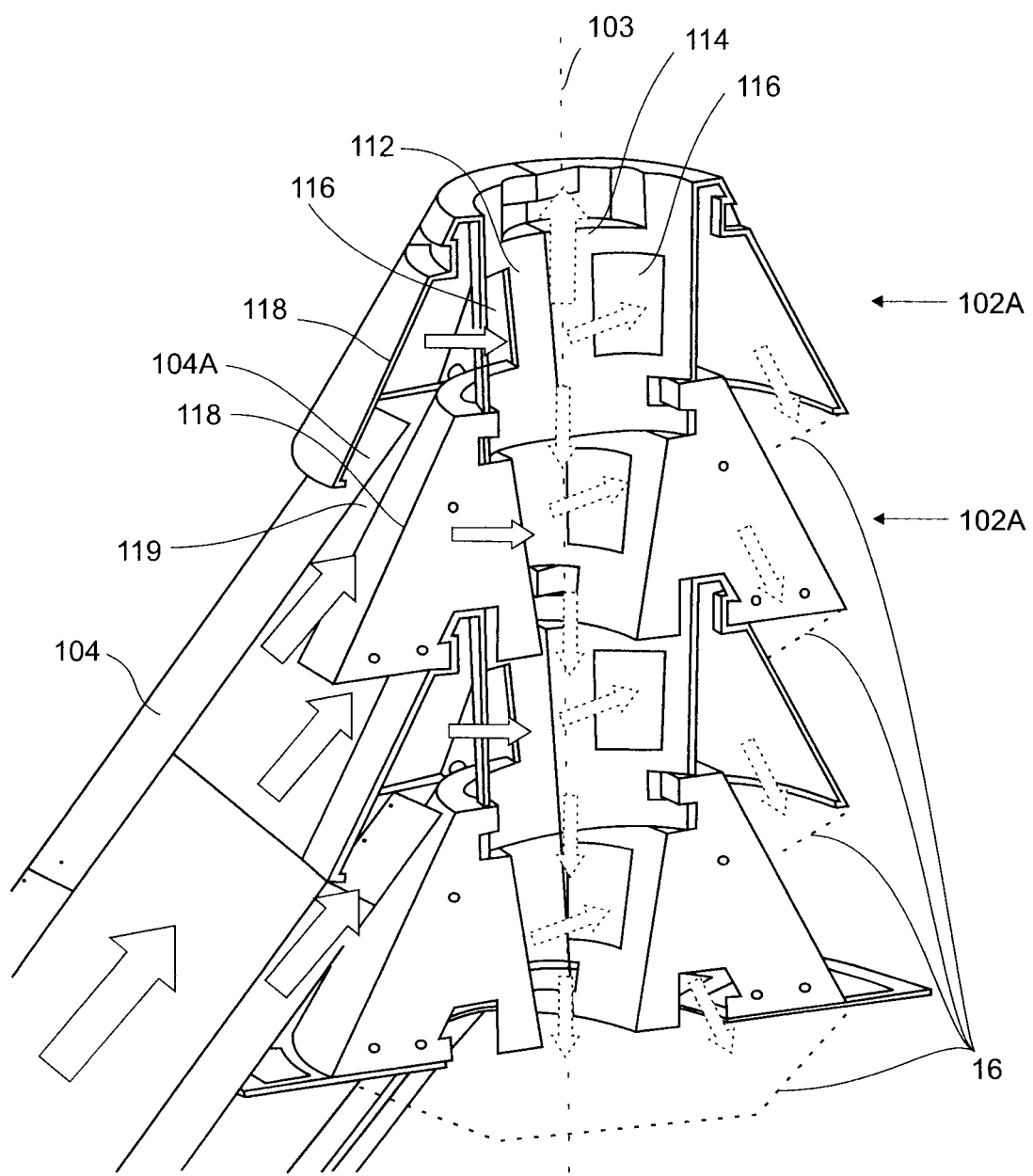
FIG. 17 is a simplified block diagram illustrating in a cross-sectional view air flow though the air supply conduit connected to a bottom portion of the aerator of the aeration system according to an embodiment.

The air supply duct 104 can comprise an end portion 104A that is adapted for being accommodated in gaps 119 between the cover walls 118 of successive modular sections 102A of the aerator 102, as illustrated in FIGS. 15 to 17. Further, the end portion 104A of the air supply duct 104 can be adapted for providing airflow to a plurality of gaps 119 such that sufficient airflow is provided to the conduit 114 through the openings 116 disposed in the inner wall 112 of the successive modular sections 102A, as indicated by the solid block arrows in FIG. 17. In operation, when the storage bin 10 is filled with the particulate material 16, as indicated by the dashed lines in FIG. 17, the static pressure of the airflow enables aeration of the particulate material 16 through the air space between the cover walls 118 and the inner walls 112, as well as downwardly below the bottom modular section 102A of the aerator 102, as indicated by the dashed block arrows in FIG. 17, and upwardly through the conduit 114 and through the openings 116 of the modular sections 102A stacked thereupon, as described hereinabove.

Figure 18:
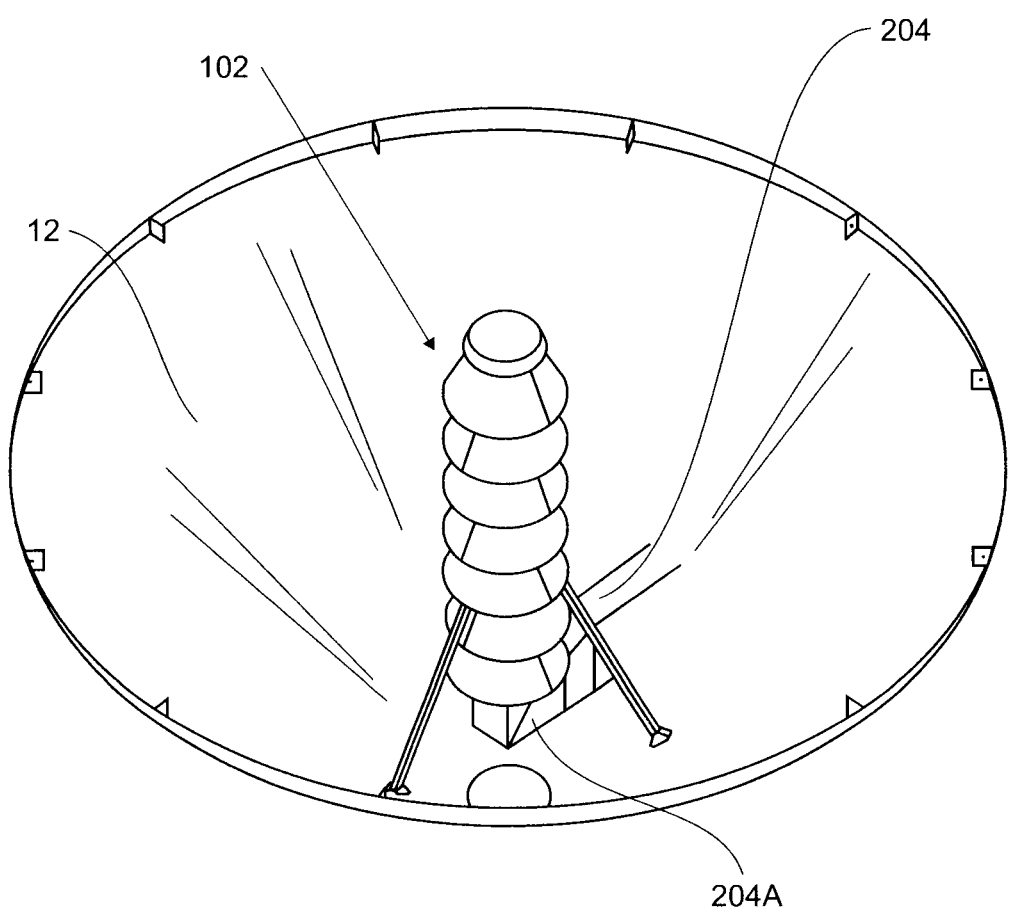
FIG. 18 is a simplified block diagram illustrating in a perspective top another air supply conduit connected to the aerator of the aeration system according to an embodiment.

Alternatively, the airflow is directly provided to the conduit 114 using, for example, an elbow section 204A of air supply duct 204 directly connected to the bottom of bottom modular section 102A, as illustrated in FIG. 18.

Figure 19:
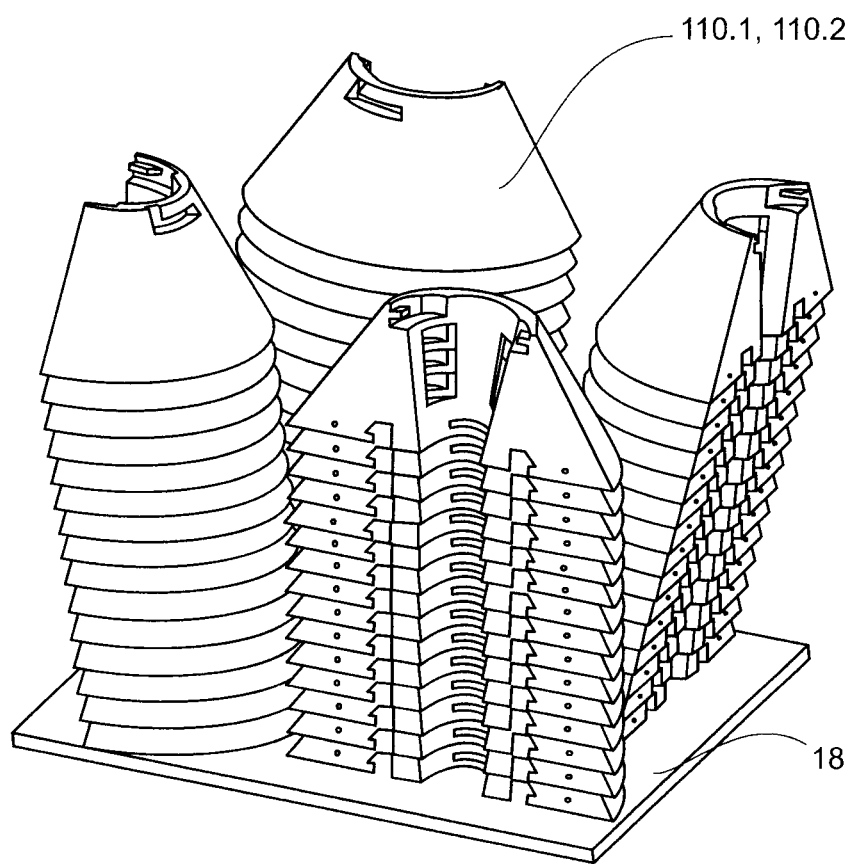
FIG. 19 is a simplified block diagram illustrating in a perspective top view stacked modules of the aeration system according to an embodiment.
Figure 20:
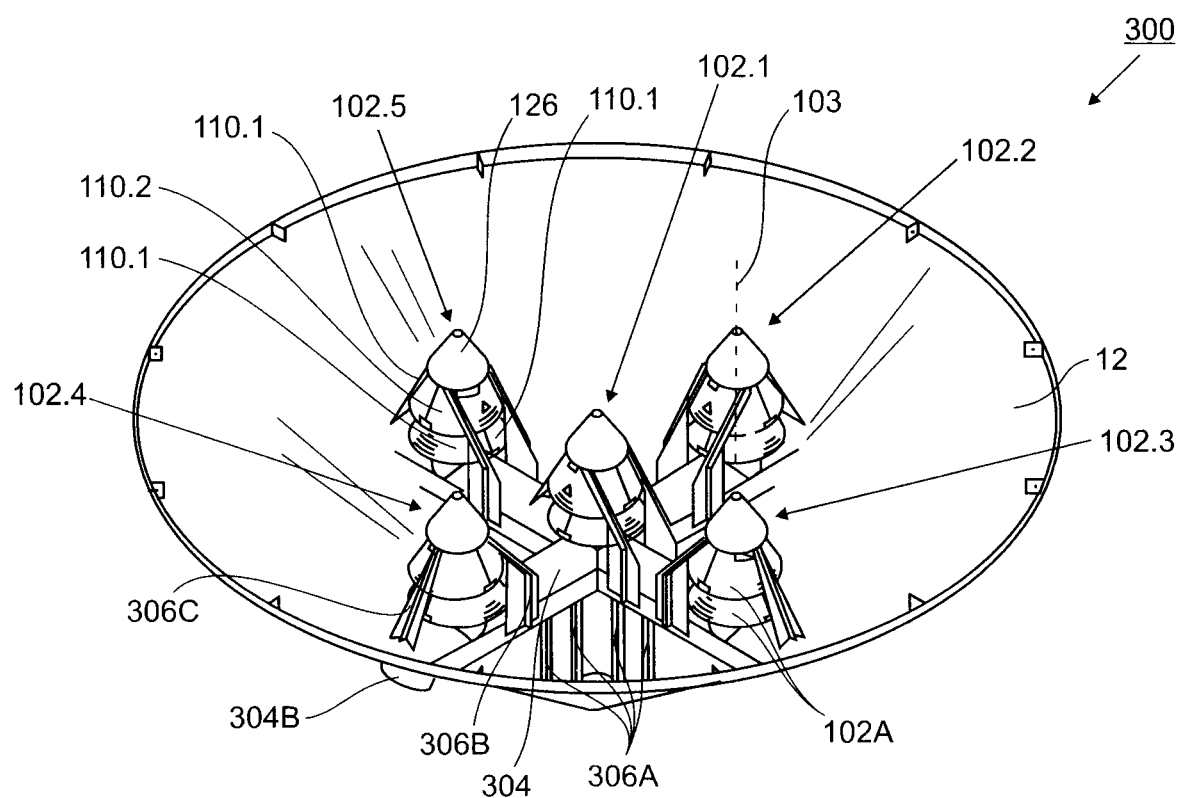
FIG. 20 is a simplified block diagrams illustrating in a perspective top view an aeration system according to another embodiment.
Figure 21:
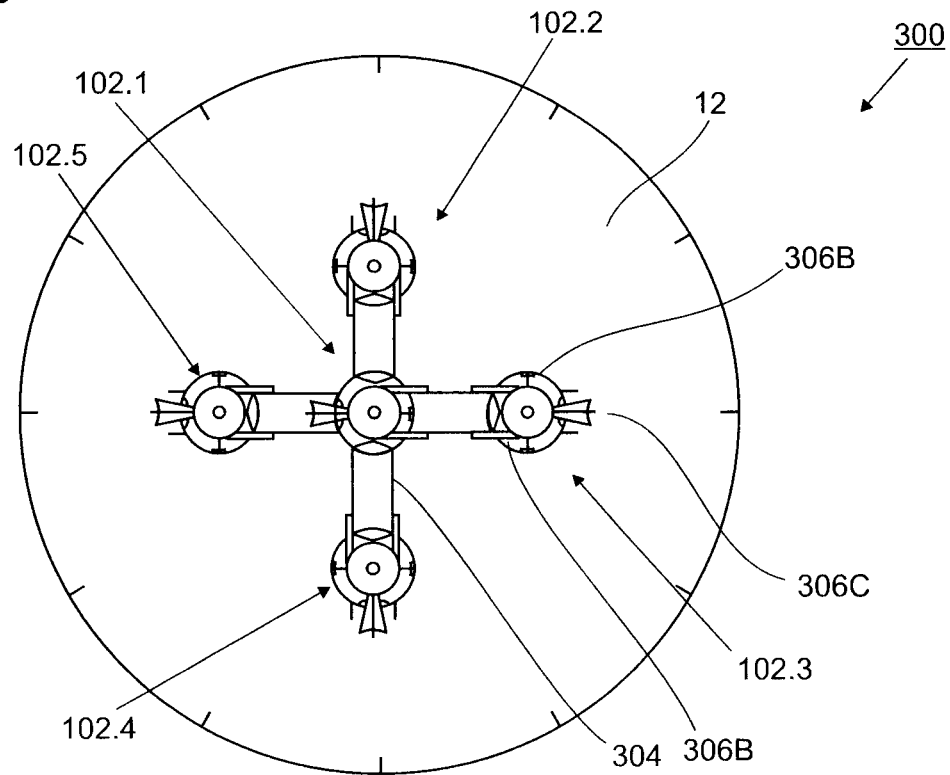
FIG. 21 is a simplified block diagram illustrating in a top view an aeration system according to another embodiment.

The modules 110.1, 110.2 can be shaped such that they can be stacked in a space-saving manner, for example, by orienting the inner wall 112 upwardly and outwardly, as illustrated in FIG. 19, allowing placing of 4 stacks of 15 modules 110.1, 110.2 having the dimensions described hereinabove onto a standard palette 18.

Referring to FIGS. 20 to 24 a modular aeration system 300 according to another embodiment is provided. The modular aeration system 300 comprises a plurality of aerators 102.1, 102.2, 102.3, 102.4, and 102.5 with each aerator 102.x being connected to air supply duct 304 for receiving an airflow from air inlet 304B and providing the same to each of the aerators 102.x. Each of the aerators 102.x is provided in a similar fashion as described hereinabove, made of a plurality of modular sections 102A stacked upon each other along the longitudinal axis 103. The modular sections 102A can be made of two modules 110.1, 110.2 with each module 110.1, 110.2 having an inner wall 112 forming a part of conduit 114 for enabling the airflow along the longitudinal axis 103. It is noted that each of the modular sections 102A may be provided as a single unit or by combining two or more modules.

Each of the aerators 102.x further comprises top cap 126 for preventing the particulate material from entering the top of the conduit 114. The top cap 126 can comprise structure 128 for deflecting the particulate material during filling of the storage bin 10 such as, for example, a cone or dome shaped structure, and bottom connecting elements 122A placed at a bottom end thereof which are connected with the respective top connecting elements 122B of the top modular section 102A of the aerator 102.

Figure 24:
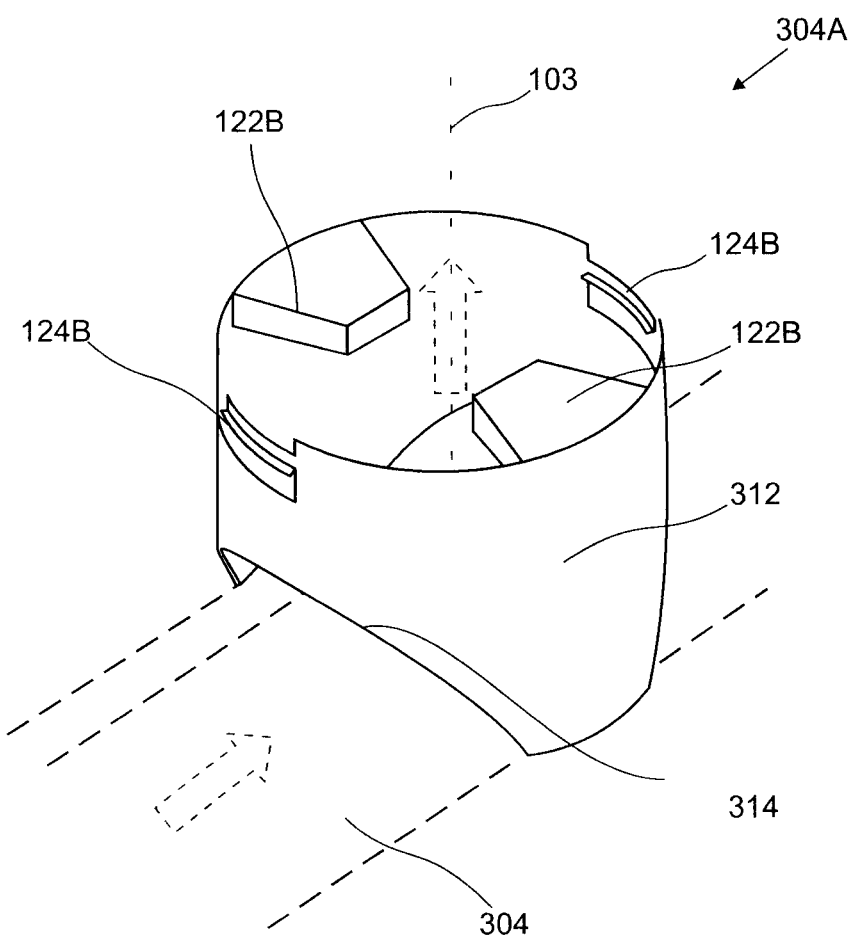

Air supply duct connector 304A can be interposed between the air supply duct 304 and each of the aerators 102.x for providing the airflow from the air supply duct 304 to the respective aerator 102.x, as indicated by the dashed block arrow in FIG. 24. For example, each of the air supply duct connectors 304A comprises a cylindrical wall 312 which is mounted to the air supply duct 304 (indicated by the dashed lines in FIG. 24) at connecting edge 314 using a conventional fastening technique such, for example, welding or screw fastening. Further, each of the air supply duct connectors 304A can comprise top connecting elements 122B and 124B placed at a top end thereof for being mated with the respective bottom connecting elements 122A and 124A of a bottom modular section 102A of the respective aerator 102.x.

Further, support structure 306A can be interposed between the air supply duct 304 and the hopper bottom 12 of the storage bin and mounted thereto. Optionally, support brackets 306B and 306C are provided for strengthening each of the aerators 102.x. The support brackets 306B and 306C are mounted, for example, to the air supply duct 304 and the modules 110.1 and 110.2.

The air supply duct 304 and the air supply duct connectors 304A are made of suitable materials such as, for example, aluminum sheet material or steel sheet material using conventional metal processing technologies. The support structure 306A and the support brackets 306B and 306C are made of, for example, aluminum or steel components which are assembled in a conventional manner using screw fasteners.

Depending on design preferences, the modular aeration system 300 may be provided with a different number of aerators 102.x and/or in a different arrangement of the same than illustrated. Furthermore, the aerators 102.x may comprise a different number of modular sections 102A than 2 as illustrated such as, for example, 1 or 3, as well as some aerators 102.x may comprise a different number of modular sections 102A than others, for example, the aerator 102.1 may comprise 5 modular sections while the aerators 102.2 to 102.5 may comprise 2 modular sections 102A.

The present invention has been described herein with regard to certain embodiments. However, it will be obvious to persons skilled in the art that a number of variations and modifications can be made without departing from the scope of the invention as described herein.

What is claimed is:

1. An aeration system for aerating particulate material disposed in a storage bin comprising:
   an aerator forming an elongated hollow body for being placed inside the storage bin such that a longitudinal axis thereof is oriented substantially vertical, the aerator being adapted for enabling an airflow therein along the longitudinal axis and for providing the same to the particulate material, the aerator being made of a plurality of modular sections adapted for being stacked upon each other along the longitudinal axis, each modular section being shaped to form a bottom connecting element and a top connecting element placed at a bottom end and a top end thereof, respectively, wherein the bottom connecting element and the top connecting element are shaped such that the top connecting element interacts with the respective bottom connecting element of an adjacent modular section in a directly interlocking manner when mated thereto for securely connecting the modular section to the adjacent modular section, each modular section having a conduit for enabling the airflow along the longitudinal axis, and at least an opening being disposed in the conduit of at least one modular section for providing the airflow to the particulate material with the at least an opening being covered by a cover extending from the conduit downwardly and outwardly such that a distance from an outer surface of the conduit to the cover increases moving toward a bottom end of the cover; and,
   an air supply duct for being connected to the aerator for providing the airflow thereto.

2. The aeration system according to claim 1 comprising a top cap, the top cap having the bottom connecting element placed at a bottom end thereof for being mated with the top connecting element of a top modular section of the stacked modular sections.

3. The aeration system according to claim 1 wherein the cover comprises a cover wall extending from the top end of the at least one modular section downwardly and outwardly and surrounding the conduit.

4. The aeration system according to claim 3 wherein the cover wall extends to the bottom end of the at least one modular section.

5. The aeration system according to claim 3 wherein the at least one modular section is made of at least two modules with each module having an inner wall forming a part of the conduit.

6. The aeration system according to claim 5 wherein each of the at least two modules comprises a part of the top connecting element and the bottom connecting element.

7. The aeration system according to claim 6 wherein the top connecting element and the bottom connecting element form a bayonet type connector.

8. The aeration system according to claim 5 wherein the at least two modules have a same shape.

9. The aeration system according to claim 8 wherein the at least two modules each have two end walls connecting an end edge of the inner wall with an end edge of the cover wall.

10. The aeration system according to claim 9 wherein the end walls are oriented such that two adjacent end walls are in a touching relationship when assembled.

11. The aeration system according to claim 10 wherein the two adjacent end walls are shaped to form a same part of the bottom connecting element.

12. The aeration system according to claim 5 wherein the inner wall of each of the at least two modules is oriented upwardly and outwardly.

13. The aeration system according to claim 3 wherein the cover wall of the at least one modular section comprise an opening for accommodating an end portion of the air supply duct therein.

14. The aeration system according to claim 13 wherein the end portion of the air supply duct is adapted to end in proximity to the conduit of the at least one modular section such that the airflow is provided to the conduit through the at least an opening disposed in the conduit.

15. The aeration system according to claim 14 wherein a bottom wall of the end portion of the air supply duct comprises at least opening disposed therein.

16. The aeration system according to claim 1 comprising a support base adapted for being mounted to a hopper bottom of the storage bin, the support base having a substantially flat top for placing a bottom modular section of the aerator thereon.

17. The aeration system according to claim 16 wherein the flat top comprises a grate-type flat plate.

18. The aeration system according to claim 1 comprising a plurality of aerators and wherein the air supply duct is connected to each of the aerators.

19. The aeration system according to claim 18 comprising a support structure mounted to the air supply duct, the support structure being adapted for being mounted to a hopper bottom of the storage bin.

20. The aeration system according to claim 18 comprising an air supply duct connector interposed between the air supply duct and each of the aerators, the air supply duct connector being mounted to the air supply duct and having a top connecting element placed at a top end thereof, the top connecting element for being mated with the respective bottom connecting element of a bottom modular section of the respective aerator.

\* \* \* \* \*